Fig. 1

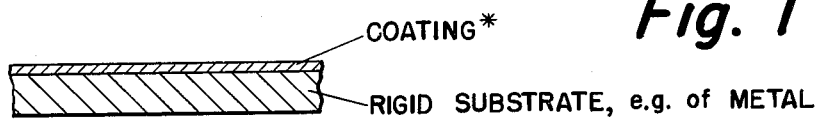

COATING*
RIGID SUBSTRATE, e.g. of METAL

*Formed of (1) a copolymer of a $C_1$-$C_4$ alkyl ester of acrylic acid or methacrylic acid with 1/4 to 5 mole percent of a comonomer containing a polar group and (2) 1/2% to 20%, by weight of the copolymer, of an ethoxyline resin.

Fig. 2

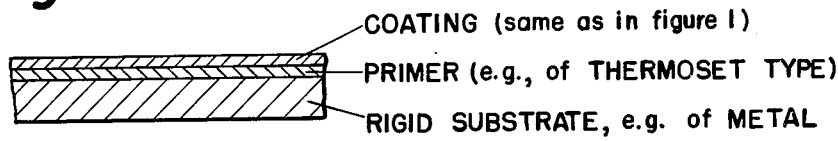

COATING (same as in figure 1)
PRIMER (e.g., of THERMOSET TYPE)
RIGID SUBSTRATE, e.g. of METAL

Fig. 3

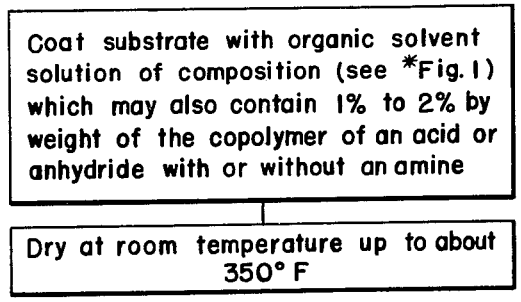

Coat substrate with organic solvent solution of composition (see *Fig. 1) which may also contain 1% to 2% by weight of the copolymer of an acid or anhydride with or without an amine Dry at room temperature up to about 350° F

Fig. 4

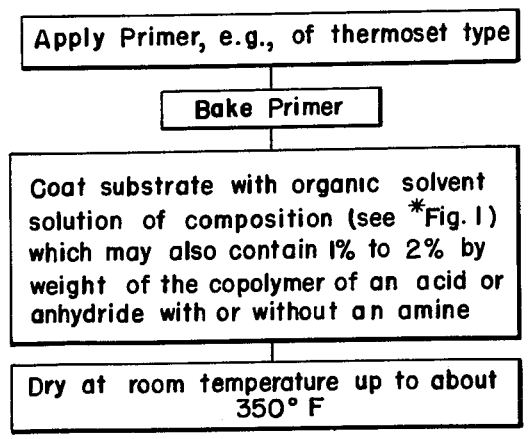

Apply Primer, e.g., of thermoset type

Bake Primer

Coat substrate with organic solvent solution of composition (see *Fig. 1) which may also contain 1% to 2% by weight of the copolymer of an acid or anhydride with or without an amine Dry at room temperature up to about 350° F

2,992,132
COATING COMPOSITIONS AND COATED METAL SURFACES

Sidney Melamed, Philadelphia, Pa., assignor to Rohm & Haas Company, Philadelphia, Pa., a corporation of Delaware
Filed June 12, 1957, Ser. No. 665,133
22 Claims. (Cl. 117—72)

This invention is concerned with improved coating compositions, articles coated therewith, and methods of coating using such compositions. It is particularly concerned with compositions which have greatly improved adhesion toward metal bases, so that they may be applied directly to bare metals, such as iron, steel, aluminum, chromium, brass and copper.

An object of the present invention is to provide a coating composition formed of an acrylic ester modified with small amounts of comonomers containing certain polar groups. It is an object to provide coating compositions of the acrylic resin type which have improved adhesion to various substrates and especially metals. Another object is to provide coating compositions of acrylic resin type which are capable of retaining thermoplastic character so that coated substrates are adapted to be re-formed after the drying of the coating on the surface of the coated article. Another object is to provide coating compositions of acrylic resin type which are self-priming. Other objects and advantages of the invention will be apparent from the description thereof hereinafter.

FIGURE 1 is an enlarged cross-sectional view of an embodiment in which the coating of the present invention is placed directly upon a rigid substrate, FIGURE 2 is an enlarged cross-sectional view of an embodiment in which the coating of the present invention is applied over a prime coat deposited on a rigid substrate, FIGURE 3 is a flow sheet illustrating the procedure for producing the coated article of the embodiment of FIGURE 1, and FIGURE 4 is a flow sheet illustrating the process of preparing the coated article of the embodiment of FIGURE 2.

In accordance with the present invention, one or more or all of these objects are obtained by incorporating with resins formed of polymerized esters of acrylic acid or methacrylic acid and small amounts of comonomers containing certain polar groups from one-half percent to twenty percent by weight of a polyepoxide or ethoxyline resin. Surprisingly the incorporation of the polyepoxide in the amount stated, which is based on the weight of the acrylic ester polymer, markedly increases the adhesion of the coating composition without introducing such an amount of cross-linking as would induce the production of a completely insoluble and infusible coating.

Although the action of the polyepoxide on the acrylic polymer of linear, thermoplastic character, does not depend upon the conversion of the coating or film-forming material to an insoluble and infusible condition, it is essential that the linear polymer contain a small amount of polar groups. Although there may be some reaction between the epoxy resin and the polar groups, as when the latter are carboxylic acid groups, the proportion of such groups which react is not sufficient to render the linear polymer infusible or insoluble as a result of cross-linking. Among such polar groups are the carboxylate groups (that is carboxylic acid or salt groups) obtained by copolymerization of the acrylic ester with a free acid such as acrylic acid, methacrylic acid or itaconic acid, ammonium salts thereof or the salts thereof with volatile, low molecular weight amines, such as morpholine, trimethylamine, triethylamine, and so on. However, when the polar groups are carboxylate groups, the polymer must not contain more than 1 mole percent of units containing the carboxylate groups. Other comonomers containing polar groups of neutral character may be used up to 5 mole percent. Regardless of whether the polar groups are of acid or of neutral character, however, it has been found that ¼ mole percent of monomeric units containing polar groups provides substantial increase in adhesion of the coating compositions when the polymer is used in conjunction with the ethoxyline resin. When the proportion of polar groups present in the polymer is in the lower part of the ranges outlined above, a larger proportion of ethoxyline resin may be needed in the coating composition to provide the desired improvement in adhesion.

Examples of comonomers which may be used to introduce the polar groups into the acrylic ester polymers, are the following:

Ureidoalkyl vinyl ethers, e.g. 2-ureidoethyl vinyl ether, 2,2-dimethyl-2-ureidoethyl vinyl ether
Glycidyl acrylate
Glycidyl methacrylate
Acrylic acid
Methacrylic acid
Itaconic acid
Acrylamide
Methacrylamide
N-alkylacrylamide (alkyl having 1 to 4 carbon atoms)
N-alkylmethacrylamide (alkyl having 1 to 4 carbon atoms)
N-methacrylamidoethyl-N,N'-ethyleneurea
N-($\beta$-($\alpha$-acryloxyacetamido) ethyl)-N,N'-ethyleneurea
N-($\beta$-($\alpha$-methacryloxyacetamido) ethyl)-N,N' - ethyleneurea A preferred group of comonomers are those of neutral character which contain an amido-linkage, such as the last seven in the list just above. These comonomers show the greatest improvement in adhesion, even though they provide no reactive sites capable of reacting with the epoxy groups. They also show the best resistance to alkalies and soap.

Polyepoxides that may be used include glycol-bis-exodihydrodicyclopentadienyl ethers having the general formula:

(I)        $O'=C_{10}H_{13}-O-R-O-C_{10}H_{13}=O'$ in which $=C_{10}H_{13}=$ is the radical of exo-dihydrodicyclopentadiene, the two O' groups are oxygen atoms which together with two adjacent carbon atoms in the $=C_{10}H_{13}=$ radicals form oxirane rings, and R is either (a) an alkylene group of 2 to 12 carbon atoms or (b) a radical of an etherified polyalkylene glycol, which radical has the formula $(R'-O-)_xR'$ in which R' is an alkylene group of 2 to 4 carbon atoms and $x$ is an integer having a value of 1 to 8 inclusive. These compounds and their production are described in U.S. Patent 2,543,419. There may also be used the "ethoxyline resins" available under the trade names of Epon or Araldite resins. They are polyether derivatives of a polyhydric phenol containing epoxy groups and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, and epichlorohydrin. For example, the reaction of epichlorohydrin with bis-(4-hydroxyphenyl)-2,2-propane may be formulated as follows:

(II)

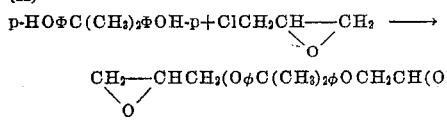

where $\phi$ is the phenylene group and $n$ has an average value varying from around zero to about 7. These resins may be made by the method disclosed in 2,324,483, 2,444,333, British Patents 518,057 and 579,698. Many of these ethoxyline resins are sold under the name of Epon resins by Shell Chemical Corporation or Araldite resins by the Ciba Company. Data on the Epon resins are given in the table below:

TABLE I

| Epon No. | Epoxide equivalent | Approximate esterification equivalent | M.P., 0° C. |
|---|---|---|---|
| RN-34 | 225-290 | 105 | 20-28 |
| RN-48 | 192 | 80 | 9 |
| 1064 | 300-375 | 105 | 40-45 |
| 1062 | 140-165 | | Liquid |
| 1004 | 905-985 | 175 | 97-103 |
| 1007 | 1,600-1,900 | 190 | 127-133 |
| 1009 | 2,400-4,000 | 200 | 145-155 |
| 1001 | 450-525 | 130 | 64-76 |

Also, there may be used polyepoxides of the formula (III) 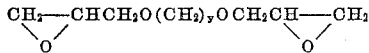

where $y$ is a number having an average value of 2 to 4. Epon 562 is of this type, is liquid at normal room conditions, and has an "Epoxide equivalent" value of 140-165. Also, a diepoxide or triepoxide of glycerol may be used. These aliphatic polyepoxides may be prepared in the known fashion as described, for example in U.S. Patents 2,730,427 or 2,752,269. The preferred polyepoxides are those having average molecular weights of about 250 to 1000.

As pointed out hereinabove, the copolymer may contain from ¼ to 1 mole percent of units containing polar groups when such polar groups are carboxylate groups. It is essential to avoid the use of more than 1 mole percent of carboxylate units since any substantially greater amount thereof renders the coating sensitive to alkalies. However, when the polar groups are of neutral character such as in all those listed hereinabove other than the acids or salts, there may be as much as 5 mole percent of units containing such polar groups in the copolymer without encountering undue sensitivity to alkali, acid, or water.

The coating composition is made up as a solution of the copolymer and polyepoxide in an organic solvent or mixture thereof. The solvent system may be made up of one or more of the following solvents:

Toluene
Xylenes
2-ethoxyethyl acetate
Methyl isobutyl ketone
Methyl ethyl ketone
Dioxane
Methoxyethanol
Ethoxyethanol
Ethyl acetate Generally, the boiling point of the solvent or solvent system should not be below 80° C. and preferably the upper limit of the boiling point of the solvent or solvent system is about 160° C.

In making up the coating compositions the copolymer is first dissolved or prepared in a solvent consisting of one or more of those mentioned hereinabove and then the epoxide may be added in the form of the dry solid or liquid consisting of substantially 100 percent of the epoxide or the epoxide may first be dissolved in one or more of the solvents mentioned above and then mixed with the solution of the copolymer. Of the epoxides, the strictly aliphatic types are preferred. Apparently the preference is attributable to the fact that lower molecular weight epoxides of reactive character can be made and serve more efficiently in increasing the adhesiveness of the coating composition to the various substrates.

The main part of the copolymer is formed from at least one ester of methacrylic acid or acrylic acid and those which are of greatest value because of their ability to form hard tough coatings are those which, in the proportion used in the copolymers, result in providing a second order transition temperature or Tg of about 40° C. or higher. The Tg value referred to is the transition temperature or inflection temperature which is found by plotting the modulus of rigidity against temperature. A convenient method for determining modulus of rigidity and transition temperature is described by I. Williamson, British Plastics 23, 87-90, 102 (September 1950). The Tg value here used is that determined at 300 kg./cm.² 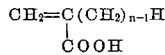. Preferably the copolymers employed have a Tg in the range of 40° C. to 110° C. In general, therefore, the main part of the copolymer consists of one or more esters of an acid of the formula $$CH_2=C(CH_2)_{n-1}H$$
$$\quad | $$
$$COOH$$

where $n$ is an integer having a value of 1 to 2, and of an ancohol having 1 to 4 carbon atoms, such as methanol, ethanol, propanol, isopropanol, n-butanol, isobutanol, sec-butanol, or t-butanol.

Of the various copolymers, those containing at least 50 mole percent of methyl methacrylate are considered to be the most important. However, copolymers containing at least 80 mole percent of ethyl methacrylate are also quite valuable but are more expensive. The balance of the copolymer units other than the proportion obtained from the units having polar groups and other than the methyl methacrylate or ethyl methacrylate may be formed of other esters of acrylic or methacrylic acid and most advantageously from the lower alcohol esters of acrylic acid such as methyl acrylate, ethyl acrylate, propyl acrylate, or butyl acrylate.

The coating composition may also be provided with such co-reactants as acids or anhydrides with or without an amine. Such co-reactants are not always essential since they are not necessary if the epoxide is already partially condensed. However, it is generally true that better results are obtained when an acid or an anhydride is added. The amount of such an acid coreactant that may be employed may vary from 1% to 2% by weight, on the weight of the copolymer, when a strong acid is employed, such as maleic acid. When weaker acids are employed or when anhydrides are used, such as dodecenylsuccinic acid anhydride, it is generally found that the proportion of acid may be even higher than 2% and it may even be as high in amount as corresponds to an equimolar amount on the basis of epoxide units in the polyepoxide. Generally, the coreactant is used in an amount within its limit of solubility in the lacquer system. Examples of the acid or anhydride that may be used include the following:

Maleic acid or anhydride
Dodecenylsuccinic acid or anhydride
Pyromellitic acid or dianhydride
Cyclopentadiene/maleic-acid anhydride adduct
Methylcyclopentadiene/maleic acid anhydride adduct
Succinic acid or anhydride
Phosphoric acid
p-Toluenesulfonic acid
Oxalic acid Acidic salts may also be used, such as:

Zinc nitrate
Zinc chloride
Hydrochloric or other acid salts of amines, e.g.
Triethylamine monosalt of maleic acid, and salts of 2-methyl-2-amino-1-propanol, 2-methyl-2-amino-1, 3-propandiol, tris-(hydroxymethyl) aminomethane, 2-phenyl - 2 - amino - 1 - propanol, 2 - methyl - 2 - amino - 1 - pentanol, 2 - amino-butanol, triethanolamine, 2-amino-2-ethyl-1-butanol, and also ammonium chloride, pyridine hydrochloride Examples of amine co-reactants that may be employed include any of the amines listed above as part of the amine salts. Other amines that may be used include methylamine, dimethylamine, ethylamine, diethylamine, propylamine, tripropylamine, etc.

The coating compositions may be applied to any rigid or substantially rigid substrate which may be formed, or the surface of which may be formed, of paper, wood, textiles, fiberglass laminates, ceramics, concrete, brick, masonry, leather, plastics, etc., but the most outstanding improvement in adhesion is obtained in the application of these coating compositions to metals which may be primed or bare, such as those of iron, steel, aluminum or chromium. The compositions of the present invention may be used as primers for metals to prepare them to receive other coating compositions, especially such as are based on polymers of esters of acrylic acid or methacrylic acid, and particularly homopolymers of methyl methacrylate and copolymers thereof with small amounts (0.1-2.5% by weight) of acrylic or methacrylic acid or with 1 to 50% by weight of an ester of acrylic acid such as ethyl acrylate, methyl acrylate, butyl acrylate, and so on. The compositions may also be used as final coatings over metal bases which carry primer or base coatings, such as the drying-oil modified alkyds, rosin-modified alkyds, mixed or co-reacted alkyds and aminoplasts, mixed or co-reacted alkyds and epoxy resins, mixed or co-reacted alkyd/aminoplast/epoxy resins, mixed or co-reacted epoxidized esters of higher fatty acids with aminoplast resins and so on.

Pigments may be included within the coating composition and within the term "pigment" it is intended to include those which have coloring value as well as simple extenders. It is a well known fact that the addition of pigments to coating compositions formed of various film-forming binders including those derived from methyl methacrylate and similar polymers lowers the level of adhesion relative to the clear composition. The improvement obtained in the adhesion by modification in accordance with the present invention has been found to be most pronounced in pigmented systems. Generally, the most common ratio of binder to pigment is in the range of 30:70 to 70:30. The pigment may vary from 1% to 80% by weight of the binder. However, the preferred proportion of pigment is from 40 to 50% by weight of the total binder.

In the application of the coating compositions, they are first dried either by air-drying or by the application of radiant heat, high frequency electric currents, infrared radiation, or the like and then they may be subjected to a curing or baking operation at elevated temperatures during which it appears that there is some reaction between the polar groups of the copolymers and the epoxide. This baking operation may be effected by heating at a temperature of 150° F. to 350° F. for a period of time which is more or less inversely related to the temperature. Thus a period of several hours may be needed at a temperature of 150° F., whereas a short time of 10–15 minutes is generally adequate at 350° F. The common condition is to employ a temperature of about 300° F. for a period of about 15–30 minutes.

In softer resins which have fair to good adhesion when baked at elevated temperatures, as on the order of 300° F. for 30 minutes, the addition of the epoxy resin and catalyst generally enables the user to employ a lower temperature bake in order to obtain as good or better adhesion. In some cases, the improved adhesion is obtained by the inclusion of the epoxy resin even without any baking; a mere air-drying at normal room temperature over a more or less prolonged period of time is sometimes entirely adequate.

While the use of a large proportion of units containing polar groups in the polymer in conjunction with a large proportion of polyepoxide, may in some cases so highly cross-link the composition in the coating during the curing operation as to render it infusible and insoluble, nevertheless the particular polar units, the amount thereof, and the proportion of the epoxide may be selected so as to avoid the conversion to insoluble and infusible conditions. In general, it is preferable to select the conditions such as to avoid rendering the coating completely infusible and insoluble. The advantages obtained in such event include the ease of retouching the coated object or surface by repeated application of the same coating composition, since the fact that the previously applied coating is still susceptible to the solvents of the coating composition facilitates the blending of the new coating with the first. Another advantage is the fact that after the application and curing of the coating, such as on a metal sheet, the coated article is adapted to be modified in shape in a forming operation and such reforming may be accomplished readily and without damage to the coating. Another advantage is the fact that the capacity of the coating to flow throughout the baking operation results in a higher gloss in the finished coating. Another advantage of coating compositions containing softer polymers is the fact that these coating compositions do not require a high temperature bake to adhere the coating to the substrate. Such compositions, therefore, can be applied and dried at lower temperatures.

The coating compositions of the present invention are remarkable in that they are essentially acrylic ester polymer coatings which do not require the priming of a metal surface in order to provide adhesion between such surface and the coating.

In the following examples, which are illustrative of the invention, the parts and percentages are by weight unless otherwise indicated, and viscosities are Gardner-Holdt unless otherwise noted.

The epoxide resins referred to in the following examples are the following:

Epoxide A is a reaction product of glycerine and epichlorohydrin having the following characteristics: an epoxy equivalent (grams of resin containing 1 g.-equivalent of epoxide) of about 150, an equivalent weight of about 60 (grams of resin required to esterify 1 g.-mole of acetic acid), a viscosity at 25° C. of about E at 100% solids, soluble in water, methanol, acetone, benzene, and toluene;

Epoxide B is a condensation product of ethylene glycol and epichlorohydrin having the following characteristics: an epoxy equivalent of about 200, an equivalent weight of about 80, a viscosity of about Z–5 (100% solids at 25° C.) soluble in methanol, acetone, benzene, and toluene;

Epoxide C is a condensation product of epichlorohydrin with 4,4'-isopropylidene-bisphenol (commonly called Bisphenol A) having the following characteristics: an epoxy equivalent of about 500, an equivalent weight of about 130, melting point range 64 to 76° C., a viscosity at 25° C. and 40% in the monobutyl ether of diethylene glycol, soluble in toluene, xylene.

Epoxide D is a condensation product of epichlorohydrin and Bisphenol A having the following characteristics. an epoxy equivalent of about 1700, an equivalent weight of about 190, a melting point range of 127 to 133° C., a viscosity at 25° C. and 40% in the monobutyl ether of diethylene glycol, soluble in toluene, and xylene.

Epoxide E is a condensation product of epichlorohydrin and a mixture of ethylene glycol and diethylene glycol having the following characteristics: an epoxy equivalent of about 175, an equivalent weight of about 75, a viscosity at 25° C. of Z-6, soluble in xylene and toluene.

*Example A.—Preparation of methacrylate polymers*

A solution of 400 parts of methyl methacrylate, 600 parts of toluene and 2.0 parts of benzoyl peroxide is heated with stirring for 10 hours. After 2, 4, and 6 hours 0.4 part of peroxide is added to insure complete conversion to polymer. The viscosity of the final solution is Z-2 at 39.6% solids. This material is designated as polymer A.

Table A lists monomers and the proportions thereof in parts by weight and the characteristics of a series of polymers prepared by the procedure used in making polymer A. In certain cases a mixture of toluene and 2-methoxyethanol is employed as solvent. The proportions by weight are indicated. Some polymers are prepared using azobisisobutyronitrile as initiator. All of these polymers except polymer A contain polar groups which are required by the present invention. Polymer A is used as a control for comparative purposes.

In the table, the following abbreviations are used.

MMA, methyl methacrylate; EA, ethyl acrylate; MAA, methacrylic acid; MAE, N-($\beta$-(methacryloxyacetamido)-ethyl)-N,N'-ethyleneurea; GMA, glycidyl methacrylate; AAm, acrylamide; MAAm, methacrylamide; DVE, 2,2-dimethyl-2-ureidoethyl vinyl ether; 2-M, 2-methoxyethanol; BPO, benzoylperoxide; AIBN, azobisisobutyronitrile.

sults are obtained when the commercial product Epon 562 is substituted for epoxide A, weight for weight.

TABLE B

[Each mixture contains 100 parts of polymer A]

| Parts epoxide A | Parts maleic acid | Film hardness [1] | Film adhesion [2] | Solubility [3] |
|---|---|---|---|---|
| None | None | H | Poor | Dissolved. |
| 10 | None | H | do | Do. |
| 10 | 0.5 | 2H | do | Do. |
| 10 | 1.0 | 2H | do | Do. |
| 20 | 2.0 | 2H | do | Do. |

[1] Pencil hardness (Koh-I-Noor pencils).
[2] Adhesion as determined by scratching with a sharp knife.
[3] In 2-ethoxyethyl acetate measured after 30 minutes.

*Example 1*

By the procedure of Example B a series of mixes were prepared using polymer B as the base. Table C indicates the proportions where the amount of each ingredient is expressed as a percentage of the polymer B solid present in the mixture. Properties of the films prepared on cold-rolled steel are indicated in Table C. The final films are still soluble in 2-ethoxyethyl acetate.

In Table C, $M^1$ means "maleic acid," $M^2$ stands for the condensation product of methyl cyclopentadiene and maleic anhydride, D means dodecenylsuccinic anhydride, and BDMA means benzyldimethylamine.

TABLE A

| Example | MMA | EA | Other monomer | Toluene | 2-M | Initiator | Weight Percent initiator on monomer | Product, visc./solids percent |
|---|---|---|---|---|---|---|---|---|
| Polymer A | 40 |  |  | 60 |  | BPO | 0.5 | Z-2/39.6 |
| Polymer B | 39.8 |  | 0.2 MAA | 60 |  | BPO | 0.5 | Z-2/40.0 |
| Polymer C | 21.9 | 17.9 | 0.2 MAA | 60 |  | BPO | 0.3 | U/39.8 |
| Polymer D | 39 |  | 1.0 MAE | 54 | 6 | BPO | 0.3 | R/30.0 |
| Polymer E | 27.3 | 11.7 | 1.0 MAE | 54 | 6 | BPO | 0.3 | S/39.6 |
| Polymer F | 38.5 |  | 1.5 GMA | 60 |  | AIBN | 0.3 | U—/30.0 |
| Polymer G | 39 |  | 1.0 AAm | 48 | 12 | BPO | 0.5 | X—/39.0 |
| Polymer H | 21.3 | 17.7 | 1.0 AAm | 48 | 12 | BPO | 0.3 | U/39.4 |
| Polymer I | 39 |  | 1.0 MAAm | 48 | 12 | BPO | 0.3 | S/39.6 |
| Polymer J | 38 |  | 2.0 DVE | 48 | 12 | AIBN | 0.5 | T/39.0 |

*Example B.—Adhesion of coatings from acrylic polymers having no polar groups*

A mixture of 100 parts of polymer A, 4 parts of epoxide A and 0.4 part of maleic acid where all parts are by weight is thoroughly blended by mechanical stirring and allowed to stand until bubble-free. Solvent-cleaned strips of aluminum, cold-rolled steel, bonderized steel, and chromium are coated with a filmograph to give films having a thickness of 5 mils wet. The films are air-dried for 15 to 30 minutes and baked at 300° F. for 30 minutes.

By this procedure a number of mixes were prepared in which the ratios of epoxide A and maleic acid to polymer A were varied. These compositions and the properties of the resultant films on cold-rolled steel are presented in Table B. In all cases the films are soft and have poor adhesion to the substrate. Similar re-

TABLE C

[Each mixture contains 100 parts of polymer B]

| Parts Epoxide A | Parts, acid or anhydride | Parts, other | Bake | Pencil hardness | Knife adhesion |
|---|---|---|---|---|---|
| None | None | None | 300° F./30' | 3H | Poor. |
| 10 | 1 (M¹) | do | 300° F./30' | 8H | Good. |
| 10 | 1 (M¹) | BDMA (0.01) | 300° F./30' | 5H | Fair. |
| 20 | 1 (M¹) | None | 300° F./30' | 7H | Good. |
| 20 | 2 (M¹) | BDMA (2.0) | 300° F./30' | 9H | Do. |
| 10 | 1 (M¹) | None | 250° F./30' | 6H | Fair-good. |
| None | 12 (M²) | do | 300° F./30' | 2H | Poor. |
| 10 | 2 (M²) | do | 300° F./30' | 8H | Good. |
| 10 | 12 (M²) | do | 300° F./30' | 8H | Very good. |
| 10 | 2 (D) | do | 300° F./30' | 8H | Good. |
| 10 | 15 (D) | do | 300° F./30' | 9H | Very good. |

Similar results are obtained when the commercial product Epon 562 is substituted for epoxide A, weight for weight.

Polymer B differs from polymer A merely by the content of 0.5% methacrylic acid. The marked effect of this small acid content on both the hardness and adhesion is quite noticeable. Compare the values of Table C with those in Table B.

*Example 2*

Table D presents the composition and film data for mixtures based on polymer C again on cold-rolled steel and additionally on chromium and aluminum. The films are soluble in 2-ethoxyethyl acetate.

TABLE D

[Each mixture contains 100 parts of polymer C]
COLD-ROLLED STEEL

| Epoxide A | Maleic acid | Bake (° F.) | Pencil hardness | Knife adhesion |
| --- | --- | --- | --- | --- |
| None | None | 300°/30′ | 4H | Good. |
| Do | None | 200°/30′ | 2H | Poor-fair. |
| Do | None | Air-dry 75°/1 week | H | Poor. |
| 10 | 1 | 300°/30′ | 4H | Excellent. |
| 10 | 1 | 200°/30′ | 3H | Good. |
| 10 | 1 | Air-dry 75°/week | 2H | Do. |

ALUMINUM

| None | None | 300°/30′ | 3H | Fair. |
| --- | --- | --- | --- | --- |
| 10 | 1 | 300°/30′ | 4H | Excellent. |
| 10 | 1 | 200°/30′ | 2H | Good. |
| 10 | 1 | Air-dry 75°/1 week | 2H | Do. |

CHROMIUM

| None | None | 300°/30′ | H | Poor. |
| --- | --- | --- | --- | --- |
| 10 | 1 | 300°/30′ | 3H | Good. |
| 10 | 1 | Air-dry 75°/wk | 2H | Fair. |

Similar results are obtained when the commercial product Epon 562 is substituted for epoxide A, weight for weight.

Polymer C is a copolymer containing 0.5% methacrylic acid which differs from polymer B by the substitution of ethyl acrylate for part of the methyl methacrylate. Polymer C without the compounding with an epoxide has somewhat better adhesion than polymer B used alone. Use of an epoxy resin with polymer C makes it possible to eliminate baking or to use a lower baking temperature and/or time without sacrifice in adhesion. Generally, however, hardness is increased with increase in severity of the baking schedule.

*Example 3*

In Table E a comparison is made of a variety of functional groups in a relatively standard formulation containing 10% of epoxide A and 1% of maleic acid based on polymer solids. Data are presented for film properties of each polymer alone, admixed with epoxide and acid, and each mixture as a function of baking conditions. The results given are for films on cold-rolled steel. The same trends are obtained on chromium, aluminum and bonderized steel although the exact values differ slightly from substrate to substrate. The films remained soluble in 2-ethoxyethyl acetate. Similar results are obtained when the commercial product Epon 562 is substituted for epoxide A, weight for weight.

In Table E, the additive is 10% of epoxide A and 1% maleic acid based on the weight of polymer.

TABLE E

| Polymer | Additive | Bake, ° F. | Pencil hardness | Knife adhesion |
| --- | --- | --- | --- | --- |
| D | None | 300°/30′ | 3H | Fair. |
| D | Yes | 300°/30′ | 9H | Excellent. |
| E | None | 300°/30′ | 4H | Good. |
| E | Yes | 300°/30′ | 5H | Excellent. |
| E | Yes | 200°/30′ | 2H | Good. |
| F | None | 300°/30′ | 3H | Poor. |
| F | Yes | 300°/30′ | 8H | Good. |
| G | None | 300°/30′ | 3H | Fair. |
| G | Yes | 300°/30′ | 8H | Excellent. |
| H | Yes | 300°/30′ | 4H | Do. |
| H | Yes | 200°/30′ | 2H | Good. |
| H | Yes | Air-dry 75°/1 week | H | Do. |
| I | None | 300°/30′ | 3H | Poor. |
| I | Yes | 300°/30′ | 8H | Very good. |
| J | Yes | 300°/30′ | 7H | Good. |

*Example 4*

Table F indicates the film properties obtained by the use of other epoxy resins in formulations based on polymer G. The films remained soluble in 2-ethoxyethyl acetate.

TABLE F

[Each mixture contains 100 parts of polymer G; baking schedule 300° F./30′]

| Epoxide | Percent epoxide on polymer G | Maleic acid, percent on polymer G | Pencil hardness | Knife adhesion |
| --- | --- | --- | --- | --- |
| A | 10 | 1 | 8H | Good. |
| B | 6 | 1 | 7H | Do. |
| B | 12 | 1 | 8H | Do. |
| C | 12 | 1 | 8H | Do. |
| D | 12 | 1 | 5H | Fair. |
| E | 12 | 1 | 7H | Good. |
| Epon 562 | 10 | 1 | 8H | Do. |
| Epon 828 | 6 | 1 | 7H | Do. |
| Epon 1001 | 12 | 1 | 8H | Do. |
| Epon 1007 | 12 | 1 | 5H | Fair. |

*Example 5*

Table G summarizes the composition and film properties of pigmented mixtures based on polymer G. Pigment to binder weight ratio was 40:60, the pigment being titanium dioxide, and the binder including both polymer and epoxide when used. Films were sprayed (to give 1 mil thickness when dry) both on cold-rolled steel and bonderized panels primed with a red oxide automotive primer. The bonderized panels were sprayed with primer and the primer was baked at 275° F. for 45 minutes. The films remained soluble in 2-ethoxyethyl acetate. Similar results are obtained when the commercial product Epon 562 is substituted for epoxide A, weight for weight.

TABLE G

COLD-ROLLED STEEL

| | Epoxide A, percent on polymer G | Maleic acid, percent on polymer G | Pencil hardness | Knife adhesion | Tape adhesion [1] | Bake (° F.) |
| --- | --- | --- | --- | --- | --- | --- |
| (1) | None | None | 3H | Poor | | 300°/30′ |
| (2) | 10 | 1 | 6H | Good | | 300°/30′ |

PRIMED, BONDERIZED STEEL

| | | | | | | |
| --- | --- | --- | --- | --- | --- | --- |
| (3) | None | None | F | | Failed | 180°/30′ |
| (4) | 10 | 1 | F | | Good | 180°/30′ |

[1] This adhesion was measured by scribing X-shaped marks in the coating, applying Scotch tape to the marks, pressing the tape firmly against the coated surface by rubbing over it with a rubber eraser. The tape is then removed by lifting while pulling in a direction parallel to the plane of the surface so that the angle the tape makes as it leaves the surface is a small acute angle on the order of 15°. The rating is "Good" if there is no film failure.

It is to be understood that changes and variations may be made without departing from the spirit and scope of the invention as defined by the appended claims.

I claim:
1. As an article of manufacture, a substantially rigid substrate having a coating thereon comprising (1) a copolymer, the main portion of which consists of at least one ester of the formula

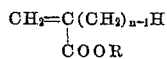

wherein $n$ is an integer having a value of 1 to 2 and R is an alkyl group having 1 to 4 carbon atoms, containing about ¼ to 5 mole percent of at least one copolymerizable monoethylenically unsaturated monomer containing a polar group and (2) ½% to 20% by weight, based on the weight of the copolymer, of a resin-forming polyether containing a plurality of vic-epoxide groups, the proportion of monomer containing a polar group and the proportion of polyether being preselected to avoid rendering the coating completely insoluble and infusible.

2. As an article of manufacture, a substantially rigid substrate having a coating thereon comprising (1) a copolymer of 95 to 99¾ mole percent of at least one ester of the formula

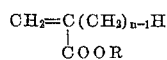

wherein $n$ is an integer having a value of 1 to 2 and R is an alkyl group having 1 to 4 carbon atoms, containing about ¼ to 5 mole percent of at least one copolymerizable monoethylenically unsaturated monomer containing a polar group and (2) ½% to 20% by weight, based on the weight of the copolymer, of a resin-forming polyether containing a plurality of vic-epoxide groups.

3. As an article of manufacture, a substantially rigid substrate having a coating thereon comprising (1) a copolymer of 95 to 99¾ mole percent of at least one ester of the formula

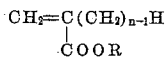

wherein $n$ is an integer having a value of 1 to 2 and R is an alkyl group having 1 to 4 carbon atoms, containing at least 50 mole percent of methyl methacrylate, and about ¼ to 5 mole percent of at least one copolymerizable monoethylenically unsaturated monomer containing a polar group and (2) ½% to 20% by weight, based on the weight of the copolymer, of a resin-forming polyether containing a plurality of vic-epoxide groups.

4. As an article of manufacture, a substantially rigid substrate having a coating thereon comprising (1) a copolymer of 95 to 99¾ mole percent of at least one ester of the formula

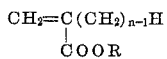

wherein $n$ is an integer having a value of 1 to 2 and R is an alkyl group having 1 to 4 carbon atoms, containing at least 80 mole percent of ethyl methacrylate, and about ¼ to 5 mole percent of at least one copolymerizable monoethylenically unsaturated monomer containing a polar group and (2) ½% to 20% by weight, based on the weight of the copolymer, of a resin-forming polyether containing a plurality of vic-epoxide groups.

5. As an article of manufacture, a substantially rigid substrate having a coating thereon comprising (1) a copolymer, the main portion which consists of at least one ester of the formula

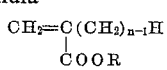

wherein $n$ is an integer having a value of 1 to 2 and R is an alkyl group having 1 to 4 carbon atoms, containing about ¼ to 5 mole percent of at least on copolymerizable monoethylenically unsaturated monomer containing a polar group selected from the group consisting of amido, ureido, and glycidyl groups and carboxylate groups selected from the group consisting of carboxylic acid, ammonium, carboxylate, and carboxylate salts of volatile amines, the amount of monomer containing carboxylate groups being not over 1 mole percent, and (2) ½% to 20% by weight, based on the weight of the copolymer, of a resin-forming polyether containing a plurality of vic-epoxide groups.

6. An article as defined in claim 5 in which the polyether is a polyepoxide of a polyhydric alcohol.

7. An article as defined in claim 5 in which the polyether is a polyepoxide of a polyphenol.

8. An article as defined in claim 5 in which the polyether is a polyepoxide of an ethylene glycol.

9. An article as defined in claim 5 in which the polyether is a polyepoxide of glycerol.

10. An article as defined in claim 5 in which the polyether is a polyepoxide of 4,4'-isopropylidene-bisphenol.

11. An article as defined in claim 5 in which the copolymer contains ¼ to 1 mole percent of methacrylic acid.

12. An article as defined in claim 5 in which the substrate is a metal.

13. An article as defined in claim 5 in which the substrate is steel.

14. An article as defined in claim 5 in which the substrate is bonderized steel.

15. An article as defined in claim 5 in which the substrate is a metal carrying a primer coating.

16. An article as defined in claim 5 in which the substrate is a primed steel in which the primer coating is a thermoset coating.

17. As an article of manufacture, a substantially rigid substrate having a coating thereon comprising (1) a copolymer, the main portion of which consists of methyl methacrylate, containing ¼ to 5 mole percent of a neutral monomer containing an amido group, and (2) ½% to 20% by weight, based on the weight of the copolymer, of a resin-forming polyether containing a plurality of vic-epoxide groups.

18. As an article of manufacture, a substantially rigid substrate having a coating thereon comprising (1) a copolymer, the main portion of which consists of methyl methacrylate, containing ¼ to 5 mole percent of a neutral monomer containing an ureido group, and (2) ½% to 20% by weight, based on the weight of the copolymer, of a resin-forming polyether containing a plurality of vic-epoxide groups.

19. As an article of manufacture, a substantially rigid substrate having a coating thereon comprising (1) a copolymer, the main portion of which consists of methyl methacrylate, containing ¼ to 5 mole percent of N-(β-(α-methacryloxyacetamido)ethyl) - N,N' - ethyleneurea, and (2) ½% to 20% by weight, based on the weight of the copolymer, of a resin-forming polyether containing a plurality of vic-epoxide groups.

20. As an article of manufacture, a metal base having a coating thereon comprising (1) a copolymer of methyl methacrylate and ¼ to 5 mole percent of methacrylamide and (2) ½% to 20% by weight, based on the weight of the copolymer, of a polyepoxide of an aliphatic polyhydric alcohol.

21. A method of preparing a coated article comprising coating a rigid substrate with a solution in an organic solvent of (1) a copolymer, the main portion of which consists of at least one ester of the formula

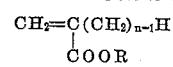

wherein $n$ is an integer having a value of 1 to 2 and R is an alkyl group having 1 to 4 carbon atoms, containing about ¼ to 5 mole percent of at least one copolymerizable monoethylenically unsaturated monomer containing a polar group, and (2) ½% to 20% by weight, based on the weight of the copolymer, of a resin-forming polyether containing a plurality of vic-epoxide groups, and then drying the coating at a temperature from room temperature to about 350° F., the proportion of monomer containing a polar group and the proportion of polyether being preselected to avoid rendering the coating completely insoluble and infusible during drying.

22. A coating composition comprising (1) a copolymer, the main portion of which consists of at least one ester of the formula

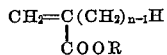

wherein $n$ is an integer having a value of 1 to 2 and R is an alkyl group having 1 to 4 carbon atoms, containing about ¼ to 5 mole percent of at least one copolymerizable monoethylenically unsaturated monomer containing a polar group, (2) ½% to 20% by weight, based on the weight of the copolymer, of a resin-forming polyether containing a plurality of vic-epoxide groups, and (3) at least 1%, based on the weight of the copolymer, of an acidic co-reactant, said copolymer and polyether being dissolved in an organic solvent, the proportion of monomer containing a polar group and the proportion of polyether being preselected to avoid rendering the coating completely insoluble and infusible even though the coating is subjected to drying and curing conditions.

References Cited in the file of this patent

UNITED STATES PATENTS

| | | |
|---|---|---|
| 2,604,457 | Segall et al. | July 22, 1952 |
| 2,754,280 | Brown et al. | July 10, 1956 |
| 2,760,886 | Prentiss et al. | Aug. 28, 1956 |
| 2,842,459 | Gollub et al. | July 8, 1958 |

FOREIGN PATENTS

| | | |
|---|---|---|
| 202,066 | Australia | Sept. 15, 1954 |